UNITED STATES PATENT OFFICE.

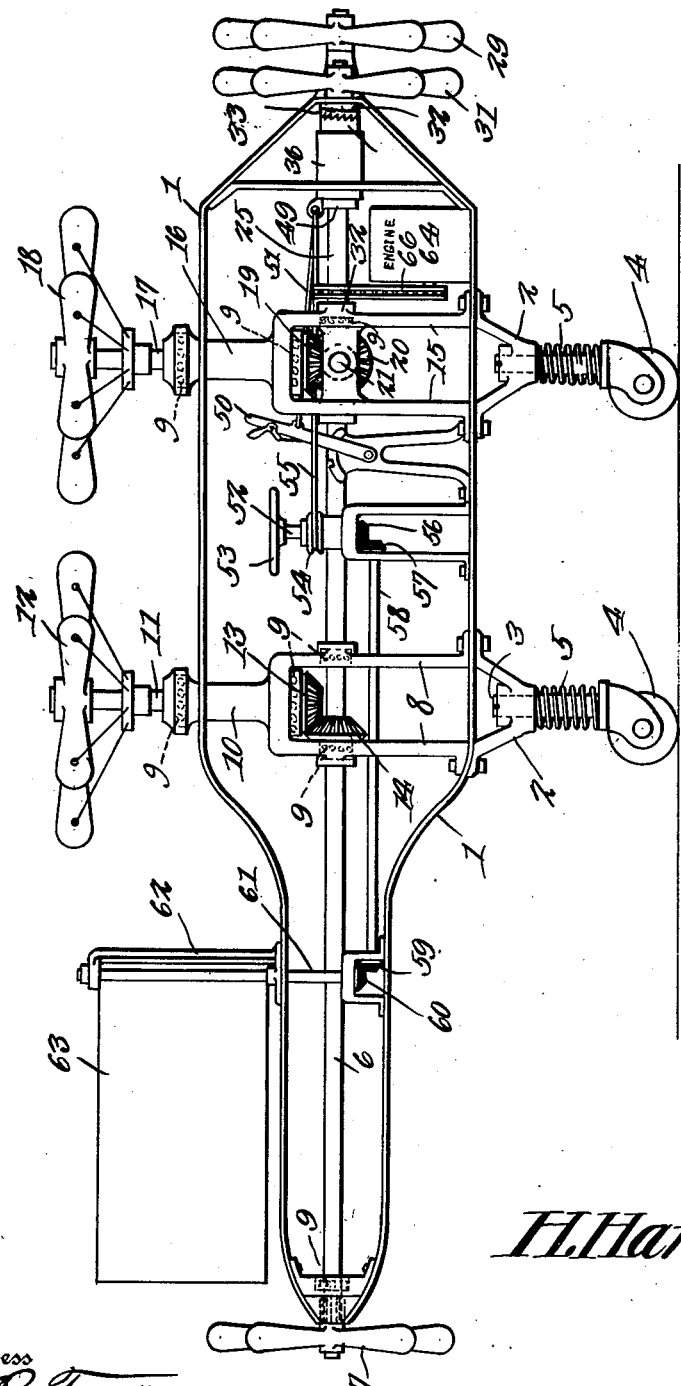

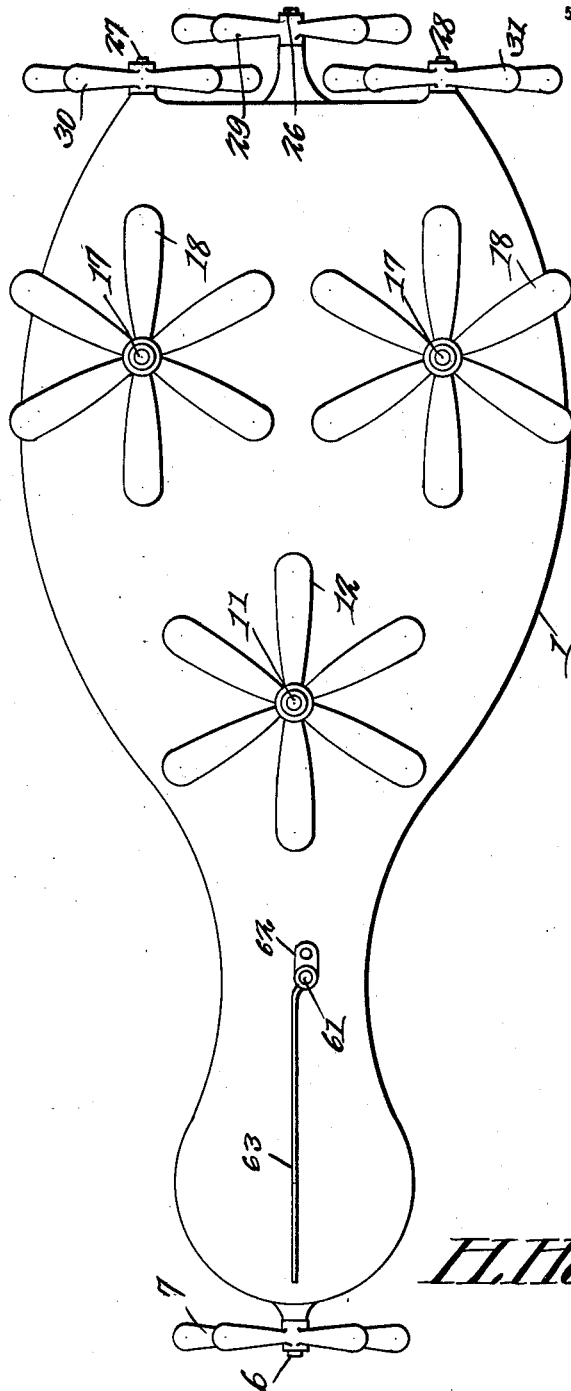

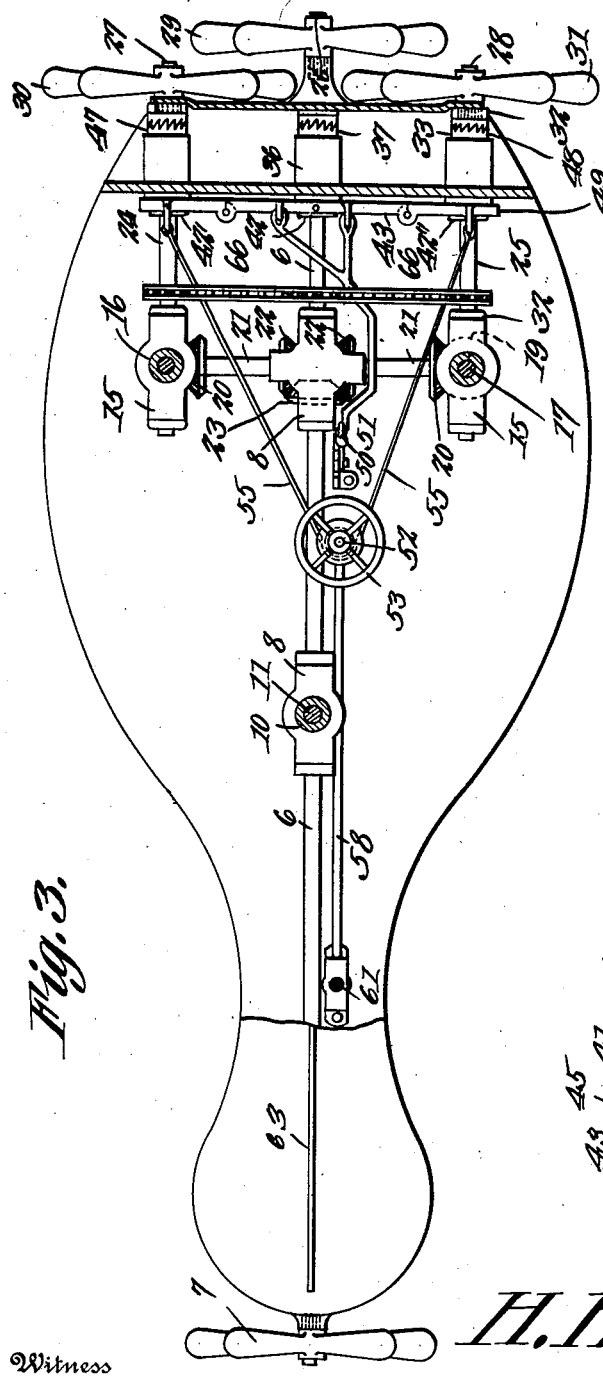
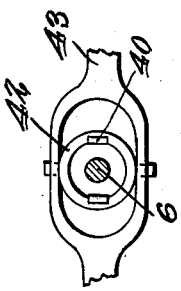
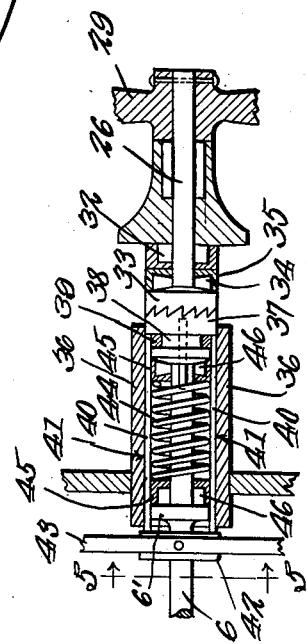

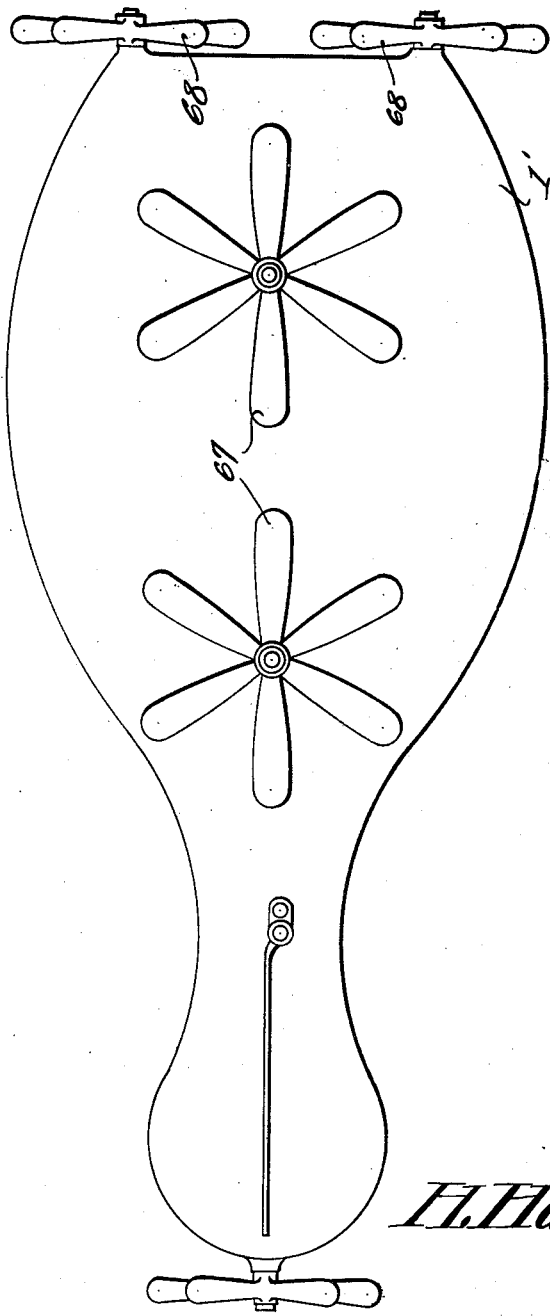

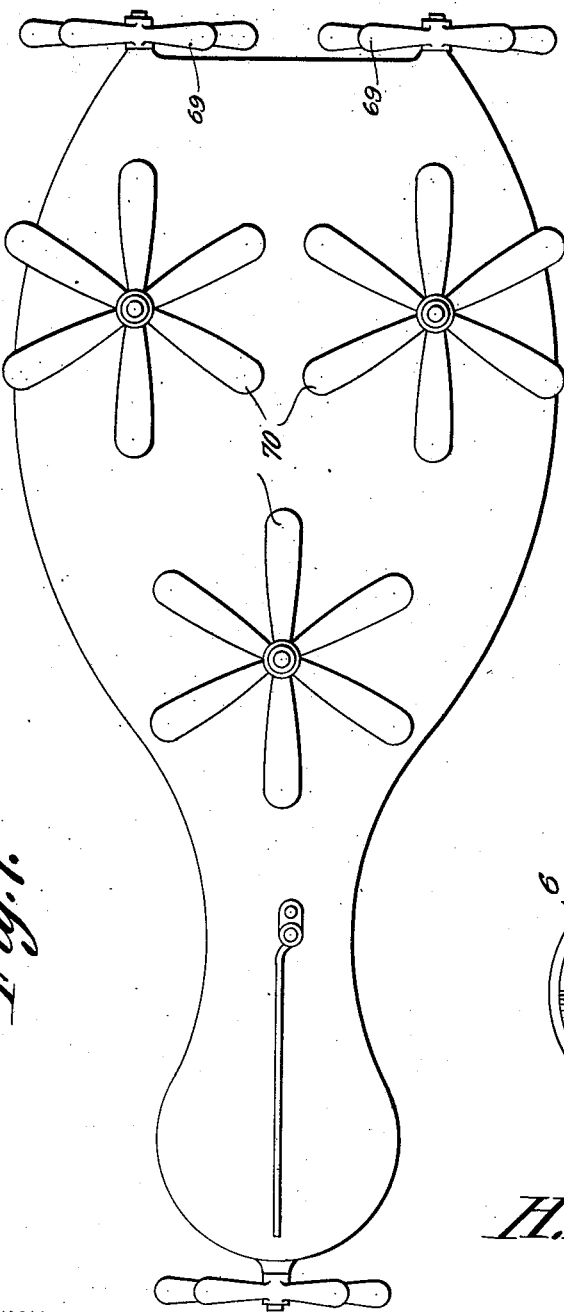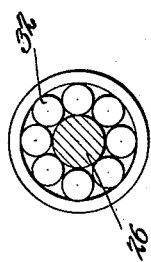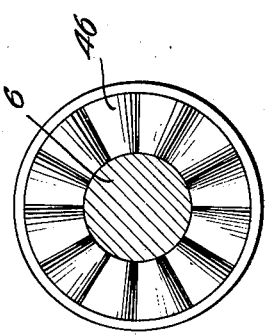

HARRY HARDEN, OF LONDON, OHIO.

AIRSHIP.

1,290,549.  Specification of Letters Patent.  Patented Jan. 7, 1919.

Application filed September 23, 1918. Serial No. 255,303.

*To all whom it may concern:*

Be it known that I, HARRY HARDEN, a citizen of the United States, residing at London, in the county of Madison and State of Ohio, have invented a new and useful Airship, of which the following is a specification.

This invention relates to airships, one of its objects being to provide an airship of the helicopter type.

Another of its objects is to provide steering mechanism of novel form whereby driving propellers and a rudder may be actuated or controlled to cause the machine to travel in the desired direction.

Another object is to provide operating and controlling mechanism of novel form which is simple and compact and will not readily get out of order.

With the foregoing and other objects in view the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Figure 1 is a side elevation of the machine.

Fig. 2 is a plan view thereof.

Fig. 3 is a horizontal section, the front portion of the airship being shown in plan.

Fig. 4 is a longitudinal section through one of the clutches controlling the propellers.

Fig. 5 is a section on line 5—5, Fig. 4.

Fig. 6 is a plan view of a modified form of airship.

Fig. 7 is a plan view of another for

Fig. 8 is a transverse section on an enlarged scale showing one of the roller bearings.

Fig. 9 is a section showing another form of anti-friction bearing.

Referring to the figures by characters of reference, 1 designates the body of the airship preferably of the peculiar configuration shown, and secured to the bottom of the body are brackets 2 in which stems 3 are slidably mounted, these stems forming parts of casters the wheels of which have been shown at 4. Springs 5 are mounted on the stems 3 and constitute cushioning means when a landing is effected or while the machine is traveling over the surface of the ground.

A main drive shaft 6 extends longitudinally along the center of the body and is provided at its rear end with a propeller 7, there being suitable supports 8 for the shaft at intermediate points which may be provided with anti-friction bearings 9, as shown. One of the supports 8 is provided with a standard 10 in which is journaled the upstanding shaft 11 of a lifting wheel or relicopter 12 arranged above the body 1. Gear 13 is secured to the lower end of the shaft 11 and meshes with gear 14 driven by the shaft 6. Any suitable arrangement of clutch, not shown, may be provided for controlling the transmission of motion to the shaft 11 from the shaft 6 through said gears. Additional supports 15 are located at opposite sides of the shaft 6 within the rear portion of the body 1 and have standards 16 in which are journaled the vertical shafts 17 of helicopters 18 similar to the helicopters 12. Gears 19 are secured to the lower ends of the shafts 17 and mesh with gears 20 secured to the outer ends of alining shafts 21 extending transversely within the body 1. Additional gears 22 are secured to the inner ends of these shafts 21 and mesh with a gear 23 on the shaft 6. Thus it will be seen that motion can be transmitted simultaneously to all of the helicopters from the shaft 6.

Arranged parallel with and at opposite sides of the front end portion of the shaft 6 are supplemental shafts 24 and 25 all of which are parallel and alining with each of the shafts 6, 24 and 25 and extending forwardly therefrom and short shafts 26, 27 and 28 respectively carrying propellers 29, 30 and 31. Anti-friction bearings 32 are provided for the shafts as shown and each of these shafts 26, 27 and 28 is provided at its inner end with a clutch member 33 provided with a thrust bearing formed preferably of tapered rollers 34 in a race 35. Each of the shafts 6, 24 and 25 is mounted for rotation in a stationary housing 36 concentric with the shaft. A clutch member 37 is feathered on the shaft 6 and has an annular groove 38 in which is seated a ring 39 connected to fingers 40 which slide in grooves 41 provided therefor in the housing. These fingers are also secured to a ring mounted loosely on the shaft 6, as shown at 42 and to which is connected the middle portion of a shifting bar 43. A coiled spring 44 is mounted on that portion of shaft 6 in the housing 36 and bears at its ends against collars which are movably mounted on the shaft as shown at 45 and carry antifriction rollers 46.

One collar 45 bears against the clutch member 37 and the other bears against a collar 6' on shaft 6, as shown. The shaft 24 has a clutch member 47 slidably mounted thereon and another clutch member 48 is feathered on the shaft 25, both of these clutch members being provided with the same arrangement of parts shown in Fig. 4 and being adapted normally to engage the clutch members on the shafts 27 and 28 respectively. The bar 43 has extensions 49 hingedly connected to the ends thereof and these extensions are pivotally connected to the collars 42' and 42" of the respective clutch members 47 and 48.

A hand lever 50 is fulcrumed on the body 1 and is connected by a rod 51 with the bar 43 so that when the lever is moved in one direction the bar 43 will be pulled straight back therewith so that the bar and its extensions 49 will shift all the clutch members 37, 47 and 48 simultaneously to uncouple the propellers 26, 30 and 31 from the drive mechanism. When the lever is moved in the opposite direction all of the propellers mentioned will be coupled up as will be obvious.

A shaft 52 is journaled in the body and is adapted to be rotated by a hand wheel 53 or in any other desired manner. This shaft has a spool 54 thereon engaged by a flexible actuating element 55 which is secured at its ends to the outer ends of the respective extensions 49. Thus when the shaft 52 is rotated in one direction it will pull on the connection 55 to swing one extension 49 rearwardly to uncouple the propeller controlled thereby and, when rotated in the opposite direction, it will pull on the other extension 49 and uncouple the other propeller from its drive shaft. A gear 56 is secured to the shaft 52 and meshes with a gear 57 secured to a longitudinal shaft 58. This shaft, in turn, has a gear 59 which meshes with a gear 60 secured to a vertical shaft 61 extending above the body 1 and bearing in a standard 62. A rudder 63 is extended from shaft 61. Thus it will be seen that when the hand wheel 53 is turned in one direction it will uncouple the propeller at the right side of the front of the airship and at the same time swing the rudder to the right. The left hand propeller will thus tend to turn the machine to the right and such movement will be assisted by the rudder. A movement of the hand wheel in the opposite direction will insure turning to the left. Thus a quick and positive control of the airship while in flight can be had. By pulling on the hand lever 51 all of the front propellers can be disconnected from the driving mechanism. Any suitable form of engine, indicated generally at 64, can be used for driving the mechanism, motion being transmitted therefrom through chain and sprocket mechanism 65 to the shaft 6 and from said shaft through chain and sprocket mechanism 66, to the shafts 24 and 25. Clutches may be located wherever desired to couple or uncouple any of the lifting or driving parts of the machine, thus to control the movement of the airship upwardly or forwardly.

Instead of arranging the lifting wheels or helicopters as shown at 12 and 18 in Figs. 1 and 2, only two such wheels can be used as shown, for example, in Fig. 6 at 67, it being preferable, in this modified form of machine, to use two propellers 68 arranged side by side and provided with means similar to that shown in Fig. 3, for placing them in and out of operative connection with the drive mechanism for the purpose of steering and driving. If preferred, however, and as shown in Fig. 7 the two propellers 69 can be combined with three lifting wheels or helicopters 70.

What is claimed is:—

1. In an airship the combination with a body, and central and side propellers at one end of the body, of clutches for coupling the respective propellers to a driving means, a bar connected to the clutch of the central propeller, hinged extensions on the ends of the bar and connected to the clutches of the side propellers, means for actuating the bar to uncouple all of the clutches simultaneously, and means for swinging either extension to uncouple either side propeller from its driving means.

2. In an airship the combination with a body and a motor therein, of helicopters, means for transmitting motion to the helicopters from the motor, central and side propellers at one end of the body, means for transmitting motion thereto simultaneously from the motor, said means including a clutch for each propeller, means under the control of the aviator for uncoupling all of the clutches of the propellers simultaneously, means under the control of the aviator for uncoupling either of the side propellers from the motor to turn the airship, and a rudder operated by said last named means.

In testimony that I claim the foregoing as my own, I have hereto affixed my signature in the presence of two witnesses.

HARRY HARDEN.

Witnesses:
P. B. EMERY,
CAROLYN FRICKER.